United States Patent [19]
Gustavsson

[11] 3,807,962
[45] Apr. 30, 1974

[54] CLEANING DEVICE IN ABSORPTION APPARATUS

[75] Inventor: Karl Axel Goran Gustavsson, Enkoping, Sweden

[73] Assignee: Aktiebolaget Bahco Ventilation, Enkoping, Sweden

[22] Filed: May 17, 1972

[21] Appl. No.: 254,104

[30] Foreign Application Priority Data
May 28, 1971 Sweden.............................. 6973/71

[52] U.S. Cl.......................... 23/283, 55/73, 55/228, 55/248, 55/296, 241/46.15
[51] Int. Cl............................................ B01d 53/14

[58] Field of Search......... 55/73, 228, 248, 295–297; 23/284, 283; 423/242–244; 241/46.15

[56] References Cited
UNITED STATES PATENTS
3,708,266    1/1973    Gustavsson.......................... 55/228

*Primary Examiner*—Bernard Nozick

[57] ABSTRACT

A cleaning device having a rotating shaft provided with scrapers and rotated by a turbine mounted thereon with said shaft extending in the feed connection of an absorption column to a grinding mill.

3 Claims, 3 Drawing Figures

CLEANING DEVICE IN ABSORPTION APPARATUS

The present invention relates to a cleaning device in an absorption apparatus for purifying sulphur dioxide containing flue gases, and more particularly in an apparatus of the type described in the Swedish Pat. No. 334,700.

The apparatus described in Swedish Pat. No. 334,700 operates with a circulating slurry of lime stone (or dolomite) as the absorbent material and mounted in the circulation circuit for the absorbent material is a mill, the purpose of which is to grind the particles of limestone present in the slurry of absorbent material so as to produce fresh, active surfaces on the particles. As is well known, the surfaces of the particles rapidly become coated with an inactivating layer, comprising substantially calcium sulphate, during the process of sulphur dioxide absorption, and hence it is not possible to utilize the activated carbonate in the interior of the particles unless the particles are ground. Failure to reactivate the absorbent particles results in a heavy reduction in the capacity of the apparatus.

The mill in which the limestone particles are ground is preferably in the form of a rotation chamber integrated with the actual absorption column and having a bottom portion, the ground absorbent material in the slurry being passed from the rotation chamber through a centrally located outlet directly into the absorption column. The rotation chamber may contain a number of grinding bodies, preferably ball-shaped bodies, which grind the particles by rolling along the walls of the rotation chamber. The kinetic energy required by the grinding bodies is supplied by the slurry itself, which is passed tangentially into the rotation chamber at a speed which causes the grinding bodies to be set into motion and caused to work. Owing to the fact that the slurry is passed tangentially into the chamber, the slurry obtains a circulating movement, which it retains while being returned to the bottom portion of the absorption column. As a result of the centrifugal force, large and heavy absorbent particles are forced out towards the wall of a container, where they act as grinding bodies, and — as a result of the friction between the particles and the wall of the container — are broken down to lighter, activated particles which migrate inwardly, towards the center of the container and pass therefrom with the suspension liquid through the outlet. Thus, in many instances the provision of special grinding bodies may be omitted and the grinding work may be effected solely by the absorbent material itself.

The level of liquid of the slurry in the bottom portion, the so-called inlet chamber, is adjusted so that flue gases charged to the inlet chamber pass through a sufficiently wide gap between the level of the liquid and the intake to the absorption column, the so-called take-up section, to enable the gases to entrain droplets from the slurry and carry the same up through the column.

On the walls of the container in the so-called semidry zone, located at and immediately above the level of the liquid, deposits of sludge are liable to form, the sludge being bound chemically to the surface of the wall or crusting thereon.

The object of the present invention is to remove these deposits in an economic manner. Accordingly, the invention relates to a cleaning device in an absorption apparatus for purifying sulphur dioxide containing flue gases, using a limestone slurry as the absorbent material, which apparatus includes an absorption column having a bottom portion containing a collecting absorbent liquid, a tubular take-up section which terminates immediately above the surface of the absorbent liquid and through which incoming flue gases in the bottom portion of the column entrain therewith droplets of the absorbent from the surface of the absorbent collection and carry said droplets to the top of the column, where they are separated, a circulation line extending between the top and the bottom of the column for returning the separated absorbent to the bottom of the column and a mill connected to the circulation line and integrated with the bottom of the column, the mill being in the form of a rotation chamber adapted for grinding recirculating absorbent and in which mill the incoming absorbent is imparted a rotary motion in a manner such that the desired grinding work is effected around the inner wall of the mill during rotation of the absorbent before the absorbent, under continued rotary motion, is returned to the bottom of the column. The invention is mainly characterized in that the cleaning device comprises a rotatable shaft mounted coaxially in the bottom of the column and a structure mounted to the shaft and provided with scrapers intended to abut the inner wall of the bottom of the column and the outer wall of the take-up section, and by a turbine wheel mounted securely to the shaft and intended to be driven by the rotating stream of absorbent material from the mill.

The invention will now be described in more detail with reference to the accompanying drawing, in which.

Figure 1:
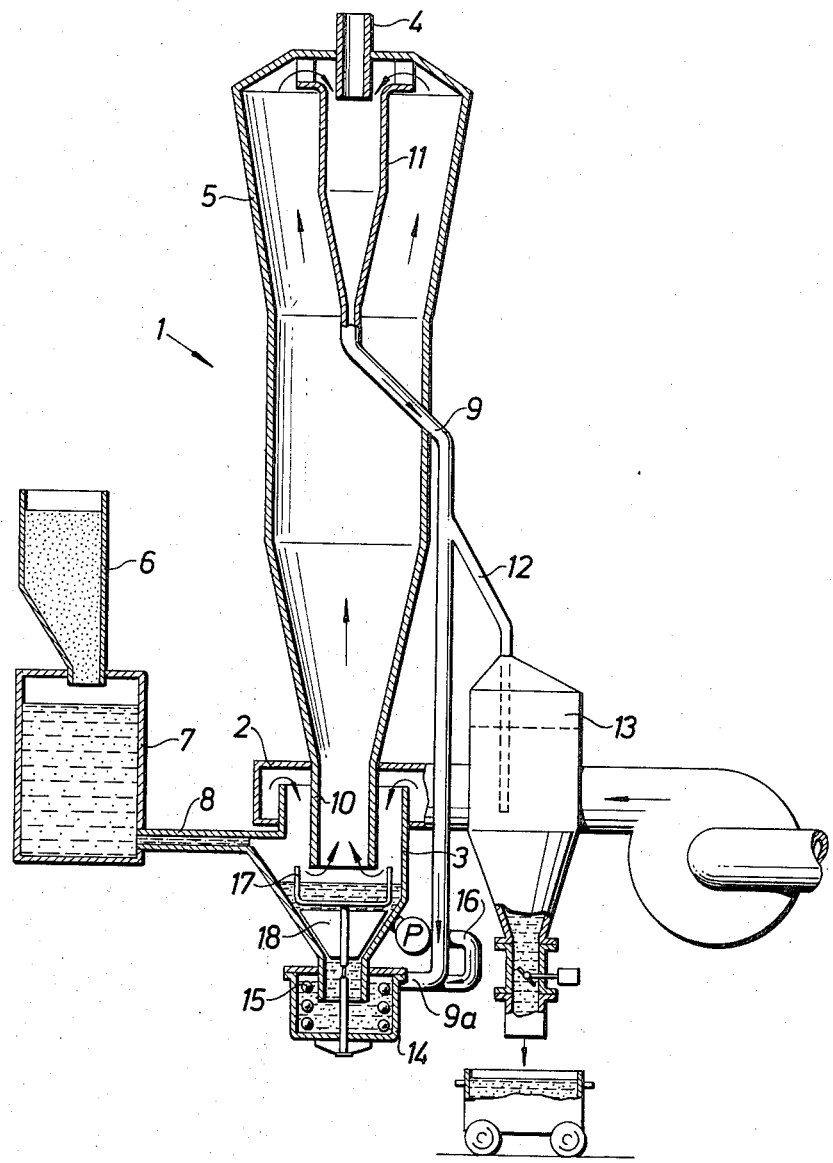
FIG. 1 illustrates diagrammatically an absorption apparatus of the type envisaged, partially in cross section, the cleaning device of the present invention being only partially shown for reasons of space.

The apparatus diagrammatically illustrated in FIG. 1 comprises an absorption column 1 having an inlet 2 for sulphur dioxide containing crude gas in the bottom chamber or inlet chamber 3 and an outlet for gas 4 purified of sulphur dioxide in the top portion 5. Fresh absorbent is charged from a limestone supply vessel 6 via a slurry preparing vessel 7 and a supply line 8 located in the bottom of the absorption column, where the fresh absorbent is mixed with an absorbent slurry recirculated through a circulation line 9. The active absorbent slurry is entrained from the bottom of the column with the crude gas entering through the inlet 2 via the take-up section 10 of the column, and continues up through the column, wherein the sulphur dioxide present in the crude gas is reacted with the limestone slurry to form an inactivated layer of substantially sulphate on the limestone particles. The slurry is separated in a droplet separator 11, while the gas cleansed of sulphur dioxide is removed through the outlet 4. The reacted absorbent slurry is conducted from the droplet separator through the circulation line 9, and returns to the process at the bottom of the column. The line 9 is provided with a branch line 12, which conducts a minor portion of the circulation liquid to a separating vessel 13 for consumed absorbent.

The circulation line 9, however, is not connected directly with the bottom of the column, but via a mill 14 of the rotary chamber type which may be provided with ball-shaped bodies 15 for grinding the inactivated limestone particles, but which may also be constructed without the provision of such bodies. For the purpose of obtaining the desired rotational effect of the slurry, the connecting portion 9a of the circulation line 9 is located tangentially with the column. Connected to the portion 9a is a line 16 arriving from the bottom of the column, there being incorporated in the line 16 a pump P through which slurry is pumped into the connecting portion 9a to impart to the slurry passed through the circulation line 9 an additional amount of kinetic energy, which has been found suitable in certain instances.

Arranged in the bottom portion is a cleaning device 17 (which for reasons of space is only partially shown) having a turbine wheel 18 securely connected thereto. The cleaning device will now be described in more detail with reference to FIG. 2.

Figure 2:
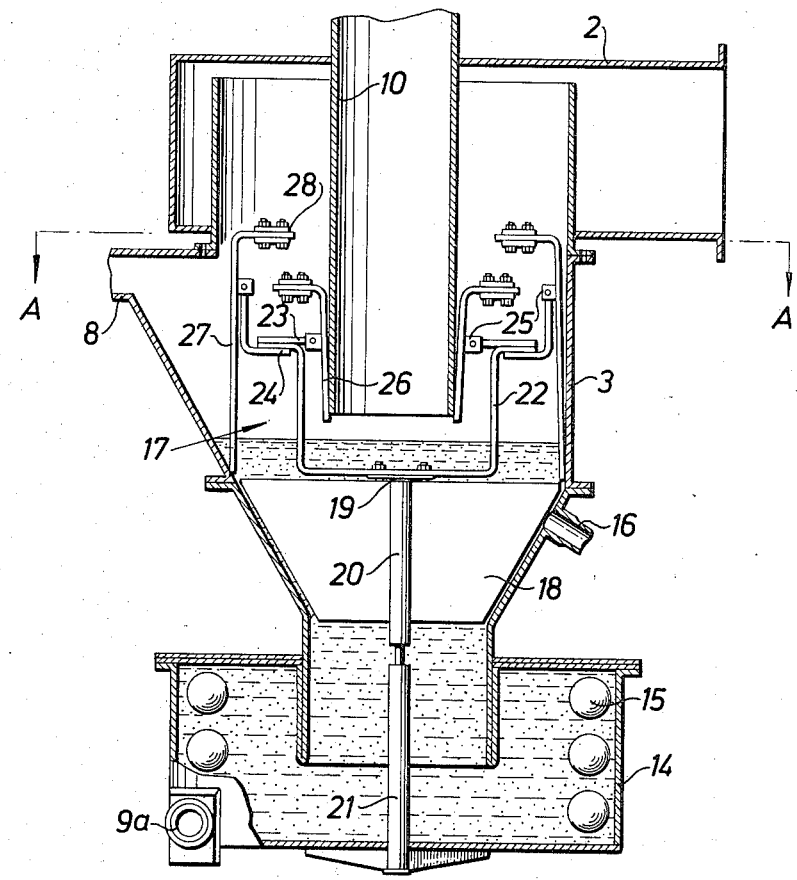
FIG. 2 illustrates in longitudinal section the inlet chamber, the rotation chamber and the cleaning device of the invention.

FIG. 2 illustrates a bottom portion and a mill of the same type as that illustrated in FIG. 1. Like elements are identified with like reference numerals. The one exception is that the connecting portion 9a of the circulation line is connected with the mill 14 at the bottom thereof instead of at the top portion of the mill.

The cleaning device 17 is mounted for rotation in the bottom portion on an end plate 19 of a vertically extending shaft 20 extending coaxial with the bottom portion and journalled at the bottom end in the upper end of an upright tube 21. The lower end of the upright tube is attached to the center of the bottom of the mill 14.

The cleaning device 17 comprises a U-shaped attachment bar 22, the two limb portions of which are bent outwardly at the end thereof to extend in a horizontal direction and attached to the web portion of the bar is the end plate 19. Each end of the bar is provided with two holders 23 and 24, of which one is directed inwardly and the other outwardly. The ends of the holders are provided with pegs 25, in which scrapers 26 and 27 are pivotally mounted so that their lower ends abut the outer wall of the take-up section 10 and the inner wall of the bottom portion 3. To provide for good abutment of the scraper bars with their respective surfaces, the upper ends of the scrapers are provided with counterweights 28.

Finally, securely mounted to the shaft 20 immediately beneath the end plate 19 is a turbine wheel 18, the vanes 29 of which (see FIG. 3) have surface edges whose configuration substantially conforms to the configuration of the inner wall of the bottom portion.

Figure 3:
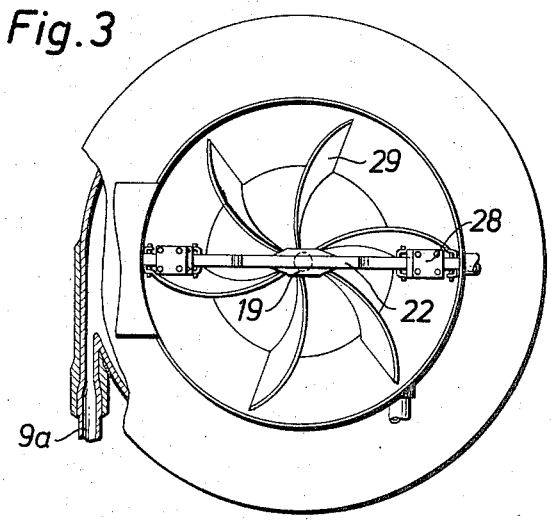
FIG. 3 is a cross-sectional view taken through the line A—A in FIG. 2.

FIG. 3 illustrates primarily the cleaning device of the present invention and the turbine wheel with its vanes seen in plan view. (The take-up section 10 has been removed for the sake of illustration).

When in operation, the recirculated and ground limestone slurry passes through the opening at the bottom of the bottom portion 3. The slurry then flows up through the bottom portion 3 while continuing to move in a rotary motion, imparted thereto in the mill 14. This causes the turbine wheel 18 to rotate, and therewith also the bar 22 with the holders 23, 24 and the scrapers 26, 27.

By utilizing in this way the rotary energy necessary for the grinding work to drive the turbine wheel and therewith the cleaning device, a saving in energy is made of the energy which would otherwise need to be provided to effect the cleaning work. Further, the rotational energy in the outlet of the mill must in all events be dampened or absorbed in some manner, since otherwise this energy presents a problem in the bottom portion of the tower and the zone where the absorbent is taken up by the crude gas. By reason of the fact that the scrapers reduce the speed of the turbine wheel to a very low number of revolutions (2–20rpm), the extra advantage is obtained by which rotation of the liquid is practically extinguished.

The invention is not restricted to the described embodiment, but can be modified within the scope of the accompanying claims. Thus, the scrapers may be provided with brushes and the counterweights may be replaced with compression or tension springs. The scrapers may also be mounted to more than one attachment bar or to an attachment bar having a different form than that illustrated and mounted for rotation in some other appropriate manner.

I claim:

1. In an apparatus for cleaning flue gases containing sulphur dioxide having:
   a. an upstanding absorption column with an outlet near its upper end for flue gases and an open bottom defining an inlet;
   b. a container below said open bottom for a slurried sulphur dioxide-absorbent material with the top of said container and the bottom of said column defining a tortuous passage for the incoming flue gas to pass against and over the surface of slurry therein to entrain the slurry so that it is carried upward with the flue gases in said column to absorb gases while being so carried;
   c. a sedimentation vessel external of said column having a valve for discharge of consumed slurry;
   d. a grinding mill positioned lower than said column for grinding reacted slurry so as to remove any inactivating coating from the slurry particles, having means for imparting rotary motion thereto with the outlet of said mill being in communication with said container;
   e. a droplet separator within the column near its outlet;
   f. a generally vertically extending conduit from said droplet separator in communication with both said sedimentation vessel and the inlet of said grinding mill so that a portion of the circulated slurry may be diverted in the sedimentation vessel and the remainder directed to the mill for grinding and recirculation through said container;

the improvement comprising a cleaning device at the bottom of the column having:
   g. a rotatable shaft mounted coaxially with the column;
   h. scraper means rotated by the shaft and positioned to abut the inner wall of the container and the outer wall of the bottom of the column;
   i. turbine means to rotate the shaft positioned to be driven by the rotating stream of absorbent material from the mill.

2. The device of claim 1 in which the scraper means are pivotally mounted in relation to the shaft.

3. The device of claim 1 in which the scraper means have counterweights to ensure effective abutment with the surfaces to be cleaned.

* * * * *